(12) United States Patent
Wang et al.

(10) Patent No.: US 11,663,741 B2
(45) Date of Patent: May 30, 2023

(54) STEREO CALIBRATION METHOD FOR MOVABLE VISION SYSTEM

(71) Applicant: SHANGHAI EYEVOLUTION TECHNOLOGY CO., LTD, Shanghai (CN)

(72) Inventors: Kaifang Wang, Shanghai (CN); Dongdong Yang, Shanghai (CN); Xiaolin Zhang, Shanghai (CN); Jiamao Li, Shanghai (CN); Wenhao Wang, Shanghai (CN)

(73) Assignee: ANHUI EYEVOLUTION TECHNOLOGY CO., LTD., Anhui (CN)

( * ) Notice: Subject to any disclaimer, the term of this patent is extended or adjusted under 35 U.S.C. 154(b) by 140 days.

(21) Appl. No.: 17/280,747

(22) PCT Filed: Jul. 18, 2019

(86) PCT No.: PCT/CN2019/096546
§ 371 (c)(1),
(2) Date: Mar. 26, 2021

(87) PCT Pub. No.: WO2020/063059
PCT Pub. Date: Apr. 2, 2020

(65) Prior Publication Data
US 2022/0044444 A1    Feb. 10, 2022

(30) Foreign Application Priority Data

Sep. 28, 2018   (CN) .......................... 201811141498.8

(51) Int. Cl.
*G06K 9/00*    (2022.01)
*G06T 7/80*    (2017.01)

(52) U.S. Cl.
CPC ...... *G06T 7/85* (2017.01); *G06T 2207/10012* (2013.01); *G06T 2207/30208* (2013.01)

(58) Field of Classification Search
CPC ............. G06T 7/85; G06T 2207/10012; G06T 2207/30208
See application file for complete search history.

(56) References Cited

U.S. PATENT DOCUMENTS

| 8,275,195 | B2* | 9/2012 | Francini | ............... | G06V 10/147 348/42 |
| 9,369,689 | B1* | 6/2016 | Tran | ..................... | H04N 13/239 |

(Continued)

FOREIGN PATENT DOCUMENTS

| CN | 103854291 A | 6/2014 |
| CN | 105588581 A | 5/2016 |

(Continued)

*Primary Examiner* — Shervin K Nakhjavan
(74) *Attorney, Agent, or Firm* — Muncy, Geissler, Olds & Lowe, P.C.

(57) ABSTRACT

A stereo calibration method for a movable vision system. The movable vision system involved in the method comprises at least two photography components, at least one calculation component, and at least one control component. The method comprises: placing a calibration template in front of photography components; rotating the photography components by degrees of freedom of motion; obtaining one or more groups of images including calibration template features, and obtaining corresponding position information at the degrees of freedom of motion when the images are obtained; obtaining, by means of calculation, a calibration result of the photography components and the degrees of freedom of motion, i.e., a rotation matrix and a translation matrix of the rotation axis at the degrees of freedom of motion with respect to the photography components; and then obtaining in real time a stereo calibration result by combining the obtained calibration result and the position (Continued)

information at the degrees of freedom of motion in the vision system. The method implements stereo calibration of the photography components in a movable multiocular system in a motion state, has a good calculation real-time property, eliminates the error problem caused by machining or assembly, and has a broad application prospect.

8 Claims, 4 Drawing Sheets

(56) References Cited

U.S. PATENT DOCUMENTS

| | | | | |
|---|---|---|---|---|
| 10,853,942 | B1* | 12/2020 | Boyd | G06V 20/17 |
| 11,176,706 | B2* | 11/2021 | Javan Roshtkhari | G03B 43/00 |
| 2002/0167726 | A1* | 11/2002 | Barman | H04N 13/239 |
| | | | | 348/E13.016 |
| 2010/0165116 | A1 | 7/2010 | Hsieh et al. | |
| 2013/0010081 | A1* | 1/2013 | Tenney | H04N 13/20 |
| | | | | 348/47 |
| 2013/0147948 | A1* | 6/2013 | Higuchi | H04N 17/002 |
| | | | | 348/135 |
| 2017/0221226 | A1* | 8/2017 | Shen | G06T 7/80 |
| 2017/0287169 | A1 | 10/2017 | Garcia | |
| 2018/0071032 | A1* | 3/2018 | de Almeida Barreto | |
| | | | | G06T 19/006 |
| 2018/0194008 | A1* | 7/2018 | Namiki | G06T 7/80 |
| 2018/0322648 | A1* | 11/2018 | Lu | G06K 9/6269 |
| 2018/0325415 | A1* | 11/2018 | Ehrl | G06T 7/246 |
| 2018/0332222 | A1* | 11/2018 | Yao | G06F 18/22 |
| 2019/0037205 | A1* | 1/2019 | Itoh | H04N 5/23296 |
| 2019/0213756 | A1* | 7/2019 | Chang | G06V 20/56 |
| 2020/0027243 | A1* | 1/2020 | Ziegler | H04N 13/246 |
| 2021/0209800 | A1* | 7/2021 | Atsumi | G06T 7/80 |

FOREIGN PATENT DOCUMENTS

| | | |
|---|---|---|
| CN | 106097300 A | 11/2016 |
| CN | 106097367 A | 11/2016 |
| CN | 106887023 A | 6/2017 |
| CN | 106981083 A | 7/2017 |
| CN | 107292927 A | 10/2017 |
| CN | 109242914 A | 1/2019 |
| JP | 2011160421 A | 8/2011 |
| JP | 2014521262 A | 8/2014 |
| JP | 2017513079 A | 5/2017 |
| JP | 2019502181 A | 1/2019 |

* cited by examiner

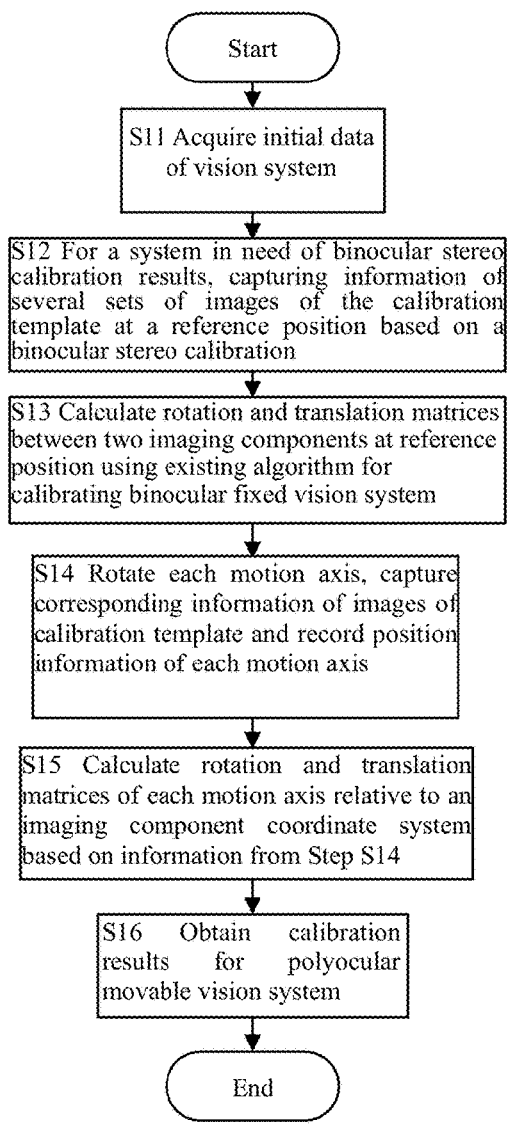
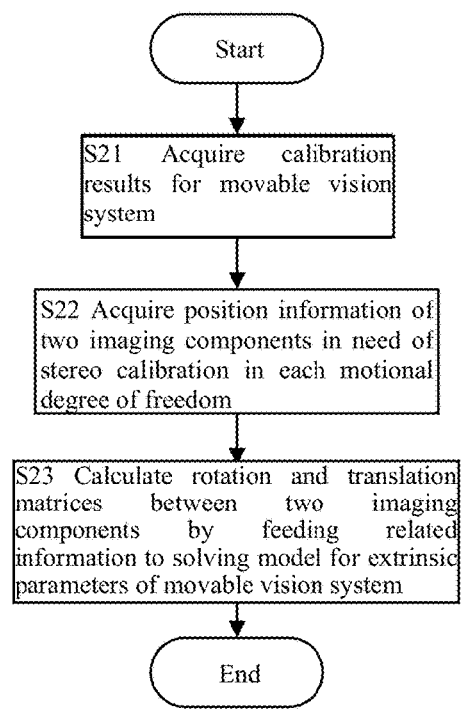
Fig. 2A
Fig. 2B

STEREO CALIBRATION METHOD FOR MOVABLE VISION SYSTEM

TECHNICAL FIELD

The present application relates to a stereo calibration method for a vision system and, in particular, to a stereo calibration method for a multi-ocular vision (two or more visions) system with at least one independently movable vision.

BACKGROUND

Existing vision systems can be generally categorized by their camera count into monocular and multi-ocular vision ones. Depending on the movability of their camera(s), these systems can also be grouped into fixed vision systems and movable vision systems. Although monocular vision systems have been extensively used because of structural simplicity and low cost, the single camera cannot obtain depth information of an object in the field of view. Among multi-ocular vision vision systems, the binocular ones are most widely used. A multi-ocular vision vision system is able to capture stereoscopic images, but the calculation of depth information of an object in the field of view requires to calibrate intrinsic parameters of the individual cameras and extrinsic parameters between them in advance.

A binocular fixed vision system has an invariant positional relationship between the two cameras, which can be determined by a single calibration of the system. For such vision systems, there have been well established and widely used calibration algorithms, such as the camera calibration algorithms based on a 3D stereo target or a 2D planar target. At a result, a fixed multi-ocular vision vision system is derived. In the fixed multi-ocular vision vision system, positional relationships between the multiple cameras can be known through calibration of the relative positions of every pair of the cameras.

In a movable multi-ocular vision system, the multiple cameras move during operation. Although the intrinsic parameters of the individual cameras do not change with movements of the cameras, their extrinsic parameters may vary. In this case, the calculation of the depth information of an object in the field of view requires post-movement extrinsic parameters of the cameras to be precisely known.

In addition, a movable multi-ocular vision system includes movable mechanical components in structure. However, due to the limited capabilities of existing mechanical machining and assembly techniques, it is challenging to ensure that each rotation axes move exactly as designed and it is difficult to ensure that imaging elements are exactly positioned relative to the rotation axes. Since stereo vision has a high requirement for accuracy of position relationship between multiple cameras, it is necessary to eliminate errors in this aspect in order to achieve a good stereo vision.

Although there have been well established and widely used calibration algorithms for binocular fixed vision system and multi-ocular vision fixed vision system derived therefrom, such as the well-known Zhang's calibration method (see "A Flexible New Technique for Camera Calibration" published by Zhang Zhengyou in 1998), there is still a lack of mature general calibration methods for movable multi-ocular vision vision systems.

SUMMARY

In order to overcome the problem that traditional stereo calibration algorithms are not able to obtain real-time extrinsic parameters of cameras in the case of movements of cameras during operation of a movable multi-ocular vision system, the present application proposes a stereo calibration method of a movable vision system, which allows to calculate relative positional relationships between imaging components using position recording components attached to rotation axes even in the case that relative positional relationships between multiple imaging components have changed and there are errors in relative positions of the imaging components and rotation axes arising from mechanical machining, assembly and other factors.

In the stereo calibration method of a movable vision system proposed by present application, calibration parameters of the multi-ocular vision movable system are calculated based on sequences of captured images and position information of each motional degree of freedom. Subsequently, extrinsic parameters of the imaging components can be calculated in real time based on the calibration parameters and information of movements of each motional degree of freedom.

Specifically, in the stereo calibration method of a movable vision system proposed by present application, the movable multi-ocular vision system includes:

at least two imaging components, each comprising at least one imaging element capable of capturing consecutive images and having an arbitrary number of motional degrees of freedom, wherein each motional degree of freedom is provided with a position acquisition device capable of acquiring rotation or translation information;

at least one calculation component capable of calculating and processing information of images and information of movement in each motional degree of freedom;

at least one control component capable of controlling movement in each motional degree of freedom.

The stereo calibration method includes: for each imaging component, recording position information of the imaging component in each motional degree of freedom at a reference position; obtaining precise parameters about relative positions between imaging elements by performing a stereo calibration at the reference position; placing a calibration template in front of the imaging elements; causing each imaging element to move in corresponding motional degree of freedom; capturing one or more sets of images containing the complete calibration template by the corresponding imaging element and simultaneously recording position information of respective motional degree of freedom when capturing respective images; and calculating calibration results for the imaging element and each motional degree of freedom by the calculation component, the calibration results comprising rotation matrix and translation matrix of each rotation axis in respective motional degrees of freedom relative to the imaging element.

The position acquisition device is provided in respective motional degree of freedom for obtaining information of movement in respective motional degree of freedom.

Specifically, the mentioned movable vision system in present application may include a number of imaging components, each having an arbitrary number of degrees of freedom each provided with a position recording component for acquiring position information (the scenarios in which all the imaging components are zero-degrees-of-freedom (zero-DOF) ones are precluded). Imaging elements included in the imaging components may be able to capture consecutive images. The system may also include: a calculation component configured to process related data and calculate desired results; and a control component for controlling motional degrees of freedom of the vision system and acquiring position information of each motional degree of freedom from the position recording component.

The present application is based on stereo calibration of binocular movable vision systems. For movable multi-ocular vision systems with more than two visions, the stereo calibration can be simplified into the individual calibration of each pair of the cameras. For example, if stereo calibration results of two imaging elements in a multi-ocular vision system with more than two imaging elements are needed, it can perform a stereo calibration of binocular movable vision system to these two imaging elements. In general terms, a single reference position is recorded. Then, two imaging elements in need of stereo calibration in moving are performed a binocular fixed calibration at the reference position to derive the rotation and translation relationship of said two imaging elements for the binocular fixed stereo calibration. Then, real-time stereo calibration results of said two imaging elements after movements of said two imaging elements can be obtained using the subsequent steps of present application.

The calibration template may be a calibration template having extractable invariant features with known information on relative positions. The calibration template, for example, may be various artificial 2D and 3D targets or some stationary natural scenes that are required to be able to extract information of the invariant features through an image processing algorithm as well as acquire relative positional relationships between the invariant features. In practical applications, a precision-machined 3D stereoscopic target or 2D planar target is often used as the calibration template, in order to improve accuracy of the calibration result and decrease difficulty of the calibration process.

The stereo calibration method of a movable vision system in present application includes the following steps.

1. Acquisition of Reference Information

A certain position is taken as a reference position for each motional degree of freedom and position information of each imaging element in corresponding motional degree of freedom relative to the reference position is recorded as reference position information $$\{\theta_{Ia}\}, a = 1 \ldots \sum_{k=1}^{K} N_k,$$

where k is a serial number of a particular imaging component, a is a serial number of a particular motional degree of freedom, which is numbered according to a connection order of the respective motional degrees of freedom, K is the total number of imaging components in the system, $N_k$ is the number of motional degrees of freedom of the k-th imaging component, and $$\sum_{k=1}^{K} N_k$$

is the total number of motional degrees of freedom of the system.

2. Stereo Calibration

Stereo calibration for multi-ocular vision system having more than two visions is performed based on binocular stereo calibration, and includes: placing a calibration template in a common field of view of the two imaging elements in need of stereo calibration; recording captured image information and obtaining a set of binocular stereo calibration results $(R_{I(x,y)}, T_{I(x,y)})$ using a calibration algorithm for a binocular fixed vision system, where $R_{I(x,y)}, T_{I(x,y)}$ represent rotation and translation matrices of the two imaging elements relative to each other, respectively. This stereo calibration process is repeated for any other pair of imaging elements in need of stereo calibration, and multiple sets of binocular stereo calibration results $\{R_{I(x,y)}, T_{I(x,y)}\}, 1 \leq x, y \leq K$ are obtained, where K represents the total number of imaging components in the system.

3. Motion Axis Calibration

With the calibration template being held stationary in a field of view of an imaging element in need of motion axis calibration, the a-th motion axis is rotated several times, and for each rotation, image information is captured and position information of each motion axis is recorded. A calculation is then performed using a calibration algorithm and the sequence of images captured at respective rotations to derive rotation and translation transformation matrices $\{R_{aCi}, T_{aCi}\}=i=1 \ldots P_a$ for each captured image relative to the position of the calibration template. This process is repeated for another motion axis until all the motion axes have been so processed. Rotation angles $\{\theta_{ai1}-\theta_{I1}, \ldots, \theta_{aiN}-\theta_{IN}\}$, $i=1 \ldots P_a$ of the motion axes relative to the reference position in the calibration results are converted into rotation matrices $$\{R_{Bai}\}, i = 1 \ldots P_a, a = 1 \ldots \sum_{k=1}^{K} N_k,$$

which are then fed into the following model describing a relationship between imaging element coordinate systems and coordinate systems of rotation axes of respective motional degrees of freedom:

$$W_{ai} = \begin{bmatrix} R_{BCa} & T_{BCa} \\ O & 1 \end{bmatrix}^{-1} \begin{bmatrix} R_{Bai} & 0 \\ O & 1 \end{bmatrix} \begin{bmatrix} R_{BCa} & T_{BCa} \\ O & 1 \end{bmatrix},$$

$$a = 1 \ldots \sum_{k=1}^{K} N_k, i = 1 \ldots P_a$$

$$W_{1i}W_{2i} \ldots W_{Ni} = \begin{bmatrix} R_{aCi} & T_{aCi} \\ O & 1 \end{bmatrix}, i = 1 \ldots P_a$$

where $R_{BCa}, T_{Bca}$ are rotation and translation matrices of the rotation axis in the a-th motional degree of freedom relative to the imaging element coordinate system, respectively, $N_k$ is the number of motional degrees of freedom of the k-th imaging component, $R_{Bai}$ is the rotation matrix converted from the rotation angle of the a-th motion axis relative to the reference position, $R_{aCi}, T_{aCi}$ are rotation and translation transformation matrices of a coordinate system of the i-th image captured during the movement of the a-th motion axis relative to the position of the calibration template, and $P_a$ is the total number of valid images captured during rotations of the a-th motion axis when calibrating the system. Finally, several sets of equations are obtained. The optimal solution of the sets of equations, i.e., calibration results for each motion axis, is obtained by solving equations:

$$\{R_{BCa}, T_{BCa}\}, a = 1 \ldots \sum_{k=1}^{K} N_k.$$

4. Calculation of Calibration Results

From the previous steps, the reference information $$\{\theta_{Ia}\}, a = 1\ldots \sum_{k=1}^{K} N_k,$$

stereo calibration results $\{R_{I(x,y)}, T_{I(x,y)}\}, 1 \leq x,y \leq K$ and rotation and translation matrices $$\{R_{BCa}, T_{BCa}\}, a = 1\cdots \sum_{k=1}^{K} N_k$$

for imaging elements and each rotation axis in respective motional degree of freedom are obtained. For two eyes (the two eyes in the binocular vision sub-system are denoted as x,y,1≤x,y≤K, where x and y represent the left and right "eyes" of the sub-system, respectively) of the movable vision system in need of stereo calibration results in practical use, position information $$\{\theta_a\}, a = \sum_{k=1}^{x-1} N_k + 1\cdots \sum_{k=1}^{x} N_k, \sum_{k=1}^{y-1} N_k + 1\cdots \sum_{k=1}^{y} N_k$$

of the two eyes in each motional degree of freedom is obtained. Coupled with the reference position information, rotation angles $$\{\theta_{Ia} - \theta_a\}, a = \sum_{k=1}^{x-1} N_k + 1\cdots \sum_{k=1}^{x} N_k, \sum_{k=1}^{y-1} N_k + 1\cdots \sum_{k=1}^{y} N_k$$

in each motional degree of freedom can be obtained and converted into respective matrices $$\{R_a\}, a = \sum_{k=1}^{x-1} N_k + 1\cdots \sum_{k=1}^{x} N_k, \sum_{k=1}^{y-1} N_k + 1\cdots \sum_{k=1}^{y} N_k,$$

which are then fed into the model describing the relationship between the imaging element coordinate system and coordinate system of rotation axes of respective motional degrees of freedom (this innovative model is original creation of present application):

$$W_a = \begin{bmatrix} R_{BCa} & T_{BCa} \\ O & 1 \end{bmatrix}^{-1} \begin{bmatrix} R_a & 0 \\ O & 1 \end{bmatrix} \begin{bmatrix} R_{BCa} & T_{BCa} \\ O & 1 \end{bmatrix},$$

$$a = \sum_{k=1}^{x-1} N_k + 1\cdots \sum_{k=1}^{x} N_k, \sum_{k=1}^{y-1} N_k + 1\cdots \sum_{k=1}^{y} N_k$$

$$\begin{bmatrix} R' & T' \\ O & 1 \end{bmatrix} = \left( \prod_{a=\sum_{k=1}^{y-1} N_k+1}^{\sum_{k=1}^{y} N_k} W_a \right) \begin{bmatrix} R_{I(x,y)} & T_{I(x,y)} \\ O & 1 \end{bmatrix} \left( \prod_{a=\sum_{k=1}^{x-1} N_k+1}^{\sum_{k=1}^{x} N_k} W_a \right)^{-1}$$

where R' and T' are rotation and translation matrices in extrinsic parameters of the two imaging components after the binocular movable vision sub-system has moved, respectively, $R_{BCa}, T_{BCa}$ are rotation and translation matrices of the a-th motion axis relative to imaging element coordinate system, respectively, $N_k$ is the number of motional degrees of freedom of the k-th imaging component, x,y represent serial numbers of the two imaging components, which are "left eyes" and "right eyes" in the movable binocular vision sub-system, respectively, $R_a$ is the rotation matrix converted from the rotation angle of the a-th motion axis relative to the reference position, and $R_{I(x,y)}, T_{I(x,y)}$ are relative rotation and translation matrices between the "left eyes" and "right eyes" at the reference position.

Steps 2 and 3 may be performed in a reverse order.

In step 1 of stereo calibration method of present application, initial information is obtained. More specifically, a position of each motional degree of freedom is selected as a reference position, where the reference position satisfies that the imaging elements in need of stereo calibration have a common field of view. Position information of each imaging component in each motional degree of freedom is recorded as reference position information $$\{\theta_{Ia}\}, a = 1\cdots \sum_{k=1}^{K} N_k,$$

where k is a serial number of a particular imaging component, K is the number of imaging components in the whole system, $N_k$ is the number of motional degrees of freedom of the k-th imaging component, and $$\sum_{k=1}^{K} N_k$$

is the total number of motional degrees of freedom of the system.

In step 2, a stereo calibration process is performed. As above mentioned, the present application follows the principle that stereo calibration for multi-ocular system having more than two eyes is based on binocular stereo calibration. A calibration template is placed in the common field of view of the two imaging elements in need of stereo calibration (denoted as x,y,1≤x,y≤K, where x and y represent the left eye and right eye of the binocular sub-system, respectively), and image information is captured (depending on the algorithm used subsequently, it may be necessary to capture multiple sets of images at different poses of the calibration template). An algorithm for calibrating a binocular fixed vision system (For example, the camera calibration method based on a single planar checkerboard, proposed by Professor Zhang Zhengyou in 1998, or a similar algorithm, is used. Since some of algorithms have requirements for the number of images, it may be necessary to capture multiple sets of image data by changing poses of the calibration template) is then used to derive binocular stereo calibration results ($R_{I(x,y)}, T_{I(x,y)}$), where $R_{I(x,y)}, T_{I(x,y)}$ represent rotation and translation matrices between the two imaging elements, respectively. This process is repeated for any other pair of imaging elements in need of stereo calibration, and multiple sets of binocular stereo calibration results $\{R_{I(x,y)}, T_{I(x,y)}\}$, 1≤x,y≤K are obtained, where $R_{I(x,y)}, T_{I(x,y)}$ represent rotation and translation matrices between the two imaging elements, respectively.

In step 3, motion axes are calibrated. More specifically, with the calibration template being kept stationary in a field of view of an imaging element in need of motion axis calibration, the a-th motion axis is rotated several times, and for each rotation, an image $M_{ai}$ is captured by the imaging element coupled to the motion axis, and position information of the motion axis is simultaneously recorded. In this way, $\{M_{ai},\theta_{ai1},\ldots,\theta_{aiN}\}$ is obtained. Based on the sequence of images $(M_{a1},M_{a2},M_{a3},\ldots M_{aP})$ captured in the respective rotations, where $P_a$ represents the total number of valid images captured during the calibration of the a-th motion axis, a calculation is performed using a calibration algorithm (likewise, e.g., the Zhang Zhengyou's calibration method) to derive rotation and translation transformation matrices $\{R_{aCi},T_{aCi}\}, i=1\ldots P_a$ of each captured image relative to the position of the calibration template. This, coupled with the position information of the motion axis recorded during the capture of the images, allows to obtain $\{R_{aCi},T_{aCi},\theta_{ai}\}, i=P_a$. This process is repeated for another motion axis until all the motion axes have been so processed. Rotation angles $$a = 1 \cdots \sum_{k=1}^{K} N_k$$

$\{\theta_{ai1}-\theta_{I1},\ldots,\theta_{aiN}-\theta_{IN}\}, i=1\ldots P_a$ of the motion axes relative to the reference position in the calibration results are converted to rotation matrices $$\{R_{Bai}\},\ i = 1\cdots P_a,\ a = 1 \cdots \sum_{k=1}^{K} N_k,$$

which are then fed into the following model describing a relationship between imaging element coordinate system and coordinate system of rotation axes in the respective motional degrees of freedom:

$$W_{ai} = \begin{bmatrix} R_{BCa} & T_{BCa} \\ O & 1 \end{bmatrix}^{-1} \begin{bmatrix} R_{Bai} & 0 \\ O & 1 \end{bmatrix} \begin{bmatrix} R_{BCa} & T_{BCa} \\ O & 1 \end{bmatrix},$$

$$a = \cdots \sum_{k=1}^{x} N_k,\ i = 1\cdots P_a$$

$$W_{1i}W_{2i}\cdots W_{Ni} = \begin{bmatrix} R_{aCi} & T_{aCi} \\ O & 1 \end{bmatrix},\ i = 1\cdots P_a$$

where $R_{BCa},T_{BCa}$ are rotation and translation matrices for the rotation axis in the a-th motional degree of freedom relative to the corresponding imaging element, respectively, N is the number of motional degrees of freedom in the vision system, $R_{Bai}$ is the rotation matrix converted from the rotation angles of the a-th motion axis relative to the reference position, $R_{aCi},T_{aCi}$ are rotation and translation transformation matrices of a coordinate system of the i-th image captured during the movement of the a-th motion axis relative to the position of the calibration template, and $P_a$ is the total number of valid images captured in respective rotations of the a-th motion axis during the calibration process. Finally, several sets of equations are obtained. These sets of equations are solved to obtain the optimal solutions below, i.e., calibration results for each motion axis.

$$\{R_{BCa}, T_{BCa}\},\ a = 1\cdots \sum_{k=1}^{K} N_k$$

In step 4, calibration results are calculated. More specifically, from the previous steps, the reference information $$\{\theta_{Ia}\},\ a = 1\cdots \sum_{k=1}^{K} N_k,$$

stereo calibration results $\{R_{I(x,y)},T_{I(x,y)}\}, 1\leq x,y \leq K$ and rotation and translation matrices $$\{R_{BCa}, T_{BCa}\},\ a = 1\cdots \sum_{k=1}^{K} N_k$$

for the imaging element and each rotation axis in respective motional degrees of freedom are obtained. For two eyes (the two eyes in the binocular vision sub-system are denoted as x,y, $1\leq x,y \leq K$, where x and y represent the left and right "eyes" of the sub-system, respectively) of the movable vision system in need of stereo calibration results in practical use, position information $$\{\theta_a\},\ a = \sum_{k=1}^{x-1} N_k + 1\cdots \sum_{k=1}^{x} N_k,\ \sum_{k=1}^{y-1} N_k + 1\cdots \sum_{k=1}^{y} N_k$$

of the two eyes in each motional degree of freedom is obtained. Coupled with the reference position information, rotation angles $$\{\theta_{Ia} - \theta_a\},\ a = \sum_{k=1}^{x-1} N_k + 1\cdots \sum_{k=1}^{x} N_k,\ \sum_{k=1}^{y-1} N_k + 1\cdots \sum_{k=1}^{y} N_k$$

in each motional degree of freedom can be obtained and converted into respective matrices $$\{R_a\},\ a = \sum_{k=1}^{x-1} N_k + 1\ldots \sum_{k=1}^{x} N_k,\ \sum_{k=1}^{y-1} N_k + 1\ldots \sum_{k=1}^{y} N_k,$$

which are then input into the model describing the relationship between the imaging element coordinate system and coordinate system of rotation axes of respective motional degrees of freedom:

$$W_a = \begin{bmatrix} R_{BCa} & T_{BCa} \\ O & 1 \end{bmatrix}^{-1} \begin{bmatrix} R_a & 0 \\ O & 1 \end{bmatrix} \begin{bmatrix} R_{BCa} & T_{BCa} \\ O & 1 \end{bmatrix},$$

$$a = \sum_{k=1}^{x-1} N_k + 1\ldots \sum_{k=1}^{x} N_k,\ \sum_{k=1}^{y-1} N_k + 1\ldots \sum_{k=1}^{y} N_k$$

$$\begin{bmatrix} R' & T' \\ O & 1 \end{bmatrix} = \left( \prod_{a=\sum_{k=1}^{y-1} N_k + 1}^{\sum_{k=1}^{y} N_k} W_a \right) \begin{bmatrix} R_{I(x,y)} & T_{I(x,y)} \\ O & 1 \end{bmatrix} \left( \prod_{a=\sum_{k=1}^{x-1} N_k + 1}^{\sum_{k=1}^{x} N_k} W_a \right)^{-1}$$

where R' and T' are rotation and translation matrices in extrinsic parameters of the two imaging components after the binocular movable vision sub-system has moved, respectively, $R_{BCa}, T_{BCa}$ are rotation and translation matrices of the a-th motion axis relative to the imaging element coordinate system, respectively, $N_k$ is the number of motional degrees of freedom of the k-th imaging component, X, Y represent serial numbers of the two imaging components, which are "left eyes" and "right eyes" in the movable binocular vision sub-system, respectively, $R_a$ is the rotation matrix converted from the rotation angle of the a-th motion axis relative to the reference position, and $R_{I(x,y)}, T_{I(x,y)}$ are rotation and translation matrices of the left and right "eyes" at the reference position relative to each other, respectively.

In this method, steps 2 and 3 can be performed in a reverse order.

The stereo calibration system and method of the present application offers the following advantages: it allows obtaining information of intrinsic and extrinsic parameters of each imaging element through calculation even the imaging element in the movable system has moved, which can be used in calculation performed in stereoscopic vision and related algorithms; The proposed method has a good performance in real-time calculation. That is, after a single stereo calibration, the real-time information of intrinsic and extrinsic parameters of each imaging component is able to be obtained by calculating position information in each degree of freedom in subsequent. The present application is able to effectively eliminate inevitable errors caused by mechanical machining and assembly from theoretical design.

BRIEF DESCRIPTION OF THE DRAWINGS

FIG. 2A is a flowchart of a stereo calibration process for a movable multi-ocular vision system of present application.

FIG. 2B is a calculation flowchart for the real-time extrinsic parameters of a movable multi-ocular vision system of present application.

DETAILED DESCRIPTION

The present application will be described in greater detail blow with reference to particular embodiments illustrated in the accompanying drawings. For the sake of brevity, when describing the various processes, conditions and experimental methods of those embodiments, some details well known in the art are omitted, and the present application is not particularly limited to such details.

A more detailed description for stereo calibration methods of a movable multi-ocular vision system of present application will be set forth below with reference to FIGS. 1 to 6.

Figure 1:
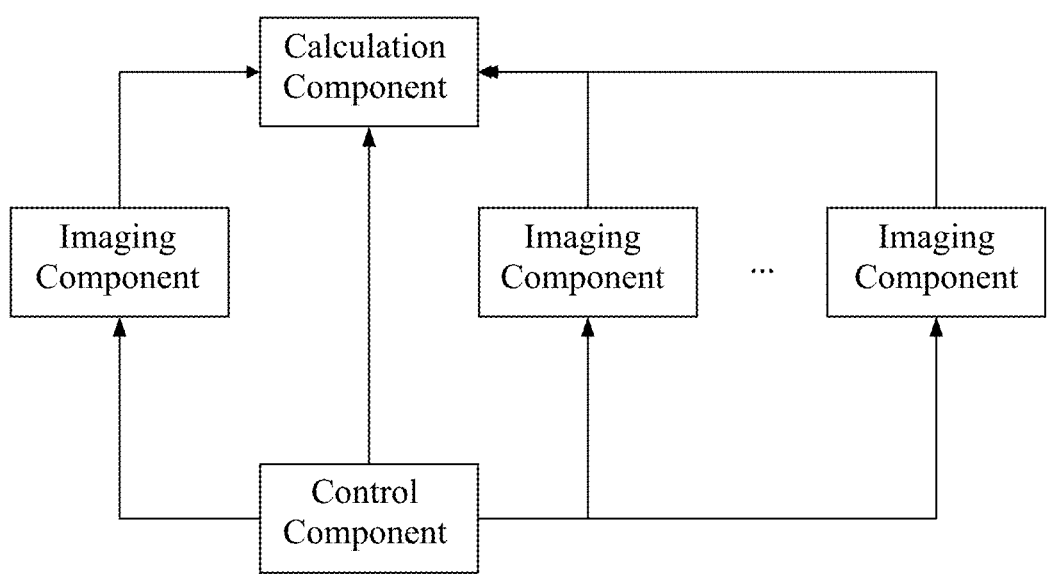
FIG. 1 is a schematic block diagram of a stereo calibration for a movable multi-ocular vision system of present application.

The movable multi-ocular vision system mentioned in the present application includes at least two sets of imaging components, at least one calculation component and at least one control component. Each imaging component may be individually provided with one calculation component and one control component. Alternatively, the imaging components may share a single calculation component and a single control component. The imaging components, calculation components, and control components are coupled by signal connections. As shown in FIG. 1, the system includes one control component, one calculation component and several sets of imaging components. The control component is configured to control movements of the imaging components in each motional degree of freedom and obtain position information of each motional degree of freedom. The calculation component is configured to calculate and process image information and information of movement in each motional degree of freedom. Each imaging component is configured to capture consecutive images and provide information of the images to the calculation component. Each of the at least two sets of imaging components has any number of motional degrees of freedom (including zero degrees of freedom; in this case, the imaging component is immobilized and cannot move), and at least one set of the imaging components is a moveable component in at least one degree of freedom.

As shown in FIG. 2A, the stereo calibration method for the movable multi-ocular vision system of present application may essentially include calibration steps and steps of extrinsic parameter calculations. Specifically, the calibration steps may include:

(S11) obtaining initial information of the vision system;

(S12) For a system in need of binocular stereo calibration results, capturing information of several sets of images of the calibration template at a reference position based on a binocular stereo calibration;

(S13) calculating and obtaining rotation and translation matrices between the two imaging components at the reference position using an existing calculation algorithm for a binocular fixed vision system;

(S14) rotating each motion axis, capturing corresponding information of images of the calibration template and recording position information of each motion axis;

(S15) based on the information captured in step S14, calculating rotation and translation matrices of each motion axis relative to a imaging component coordinate system; and (S16) obtaining calibration results for the movable multi-ocular vision system and ending the calibration process.

Steps S12 and S13 may be interchanged with steps S14 and S15 in the order in which they are performed. That is, it is also possible for the steps to be performed in the following order: S11, S14, S15, S12, S13 and S16.

The steps of calculating extrinsic parameters may include:

(S21) acquiring the calibration results for the movable vision system;

(S22) acquiring position information of the two imaging components (two eyes) in need of stereo calibration in each motional degree of freedom; and (S23) calculating rotation and translation matrices between the two imaging components by feeding related information to the solving model for extrinsic parameters of the movable vision system.

Figure 3:
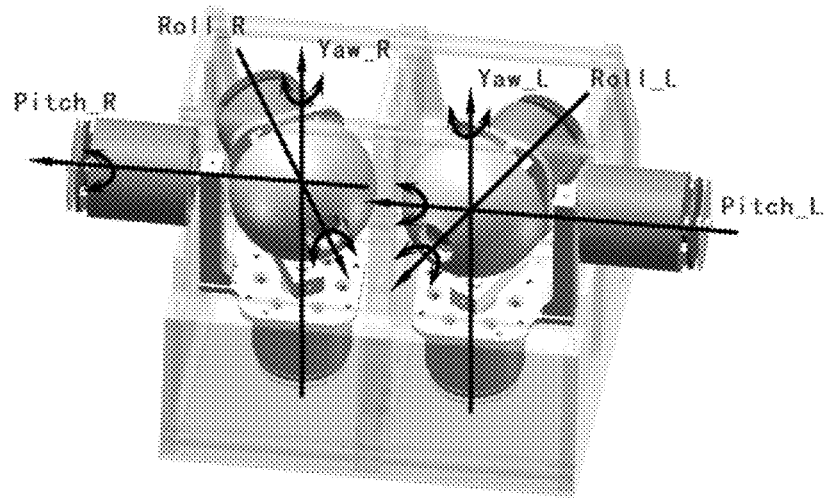
FIG. 3 is a perspective view of the mechanical structure of a six-degree-of-freedom (DOF) movable binocular vision system according to present application.
Figure 4:
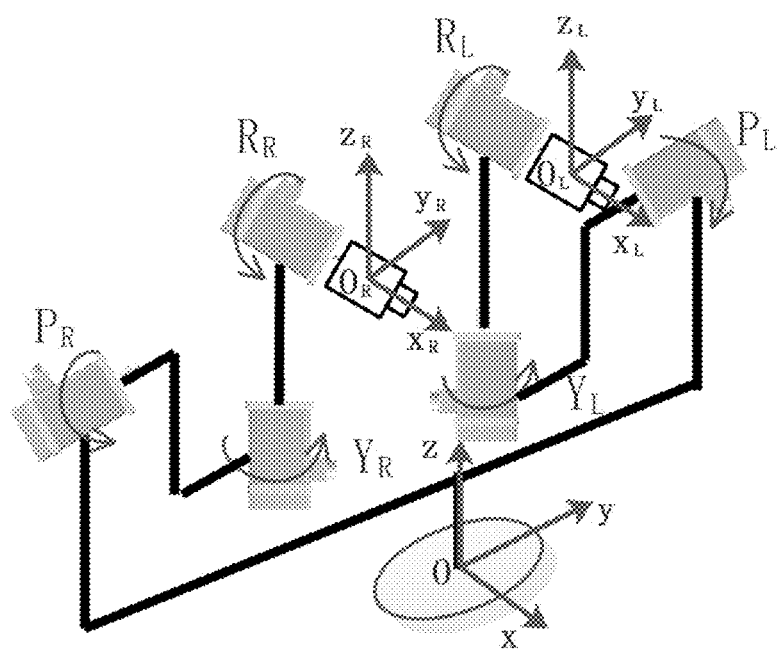
FIG. 4 shows how a coordinate system of the six-DOF movable binocular vision system of FIG. 3 is defined.

FIGS. 3 and 4 are perspective views of the mechanical structure of a six-degree-of-freedom (DOF) movable binocular vision system. As can be seen from the figures, each "eye" (i.e., eyeball) of the binocular vision system is composed of a imaging component, and the two imaging components are arranged side by side to function like left and right eyes each having three motional degrees of freedom defined respectively as pitch, yaw and roll. In a three-dimensional rectangular coordinate system, pitch refers to rotation about Y axis, yaw referring to rotation about Z axis, roll referring to rotation about X axis. For a single eyeball, the three degrees of freedom are rigidly coupled together so that movement in one degree of freedom does not affect that in remaining degrees of freedom. Optionally, pitch motors for the left and right "eyeballs" may be fixed to corresponding positions, such as bases through the casing. For roll degrees of freedom of the two "eyeballs", respective imaging elements capable of capturing consecutive images may be provided. Each of the six motional degrees of freedom is driven by respective motor to move, each motor provided with a position recorder for acquiring real-time output position information from the motor. In this example, the position information may be output from the motors as angular values. FIG. 4 shows how the coordinate system of the six-DOF movable binocular vision system of FIG. 3 is defined. The present application can be used to stereoscopically calibrate a multi-ocular vision system with an arbitrary number of motional degrees of freedom, in which the motional degrees of freedom between multiple eyes may be either symmetrical or asymmetrical. The present application can also apply to multi-ocular vision systems include several fixed eyeballs (i.e., having zero degrees of freedom) and several movable eyeballs (i.e., having at least one motional degree of freedom).

EXAMPLES

The present application will be described in detail with reference to the six-DOF movable binocular vision system as shown in FIGS. 3 and 4 as an example.

1. Calibration of Initial Data

Figure 5:
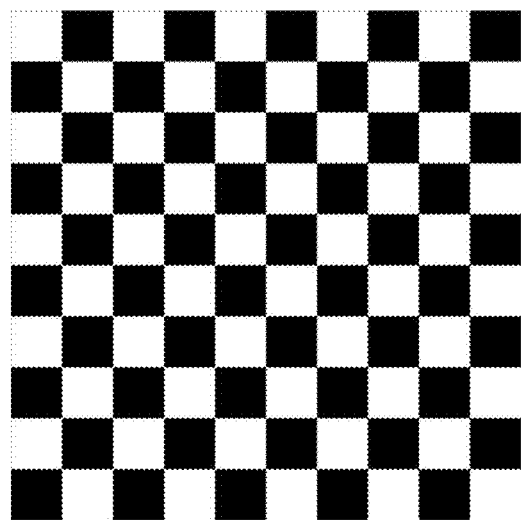
FIG. 5 shows a checkerboard calibration template used in a calibration algorithm adopted by present application.

In present application, one or more calibration templates possessing extractable invariant features with the distances between them being known may be used. In present embodiment, a camera calibration algorithm based on a single planar checkerboard proposed by Professor Zhang Zhengyou in 1998, is employed. In particular, a printed photo of a planar checkerboard, which is adhered to a plain plate, may be used as the calibration template, as shown in FIG. 5. The calibration template is then placed in a common field of view of the binocular vision system in such a manner that the calibration template is completely viewable with the binocular vision system.

In this embodiment, in order to ease difficulty level for the calculation, each degree of freedom is independently calibrated. With the calibration of the roll, pitch and yaw degrees of freedom of the left "eye" (corresponding to motors Nos. 1, 2 and 3) as an example, the calibration template is fixed in position in front of the movable binocular vision system in such a manner that the complete calibration template can be seen with the left "eyeball" imaging element. Then, each of the motors Nos. 1, 2 and 3 is rotated several times, and following each rotation, an image $M_i$ is captured by the left "eyeball" imaging element, and position information $\{\theta_{1i}, \theta_{2i}, \theta_{3i}\}$ of each motion axis corresponding to respective motor at the time when the images are captured is recorded. The combination of the images with the position information can obtain $\{M_i, \theta_{1i}, \theta_{2i}, \theta_{3i}\}$. Based on the sequence of images $(M_1, M_2, M_3, \ldots, M_P)$ captured after respective rotations, rotation and translation transformation matrices $\{R_{Ci}, T_{Ci}\}$ of each captured image with respect to the position of the calibration template can be calculated by using the planar checkerboard calibration template shown in FIG. 3 and Zhang Zhengyou's calibration algorithm. These transformation matrices are combined with the position information of the motion axes recorded at the time of the image capturing to result in $\{R_{Ci}, T_{Ci}, \theta_{1i}, \theta_{2i}, \theta_{3i}\}$ (i=1 ... P), where P represents the total number of valid images captured during calibration of motion axes.

A position allowing cameras of the binocular vision system to have a large common field of view is then chosen as a reference position for stereo calibration, and the recorded position information of the six motors in the binocular system is denoted as $(\theta_{f1}, \theta_{f2}, \theta_{f3}, \theta_{f4}, \theta_{f5}, \theta_{f6})$, where the subscripts 1 to 6 respectively represent the roll, yaw and pitch degrees of freedom of the left and right eyes (this also applies to any subsequently captured image).

In practice, in order to improve precision of stereo calibration for reference position, it is preferred that a set of calibrating images are captured when the camera is in a same position. That is, with the cameras being kept stationary, the pose of the planar checkerboard is changed in front of the cameras and multiple sets of images are captured. In general, 20 sets of images are captured.

2. Stereo Calibration of Movable Binocular Vision System

Using several sets of images of the stereo calibration template captured at the reference position $(\theta_{f1}, \theta_{f2}, \theta_{f3}, \theta_{f4}, \theta_{f5}, \theta_{f6})$ in the previous step, and Zhang's stereo calibration algorithm well-known in the art, a positional relationship (including a rotation matrix $R_I$ and a translation vector $T_I$) between the two cameras at the reference position (reference can be made to "A Flexible New Technique for Camera Calibration" published by Zhang Zhengyou in 1998 for more details in calculation steps) can be calculated.

3. Calibration of Motion Axis

Figure 6:
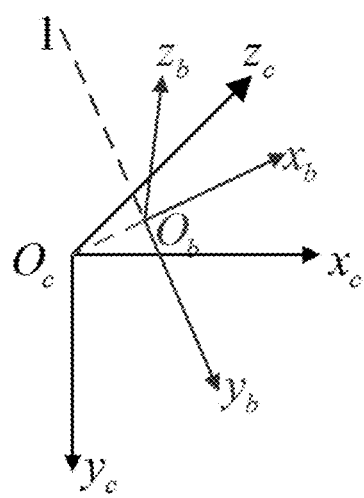
FIG. 6 schematically illustrates coordinate system of rotation axes of respective motional degrees of freedom and the imaging element coordinate system.

Limited by the existing mechanical machining techniques, it is difficult to either ensure that the optical center of the movable binocular vision system is positioned on the rotation axes or ensure that the rotation axis coordinate system is parallel to the camera coordinate systems. Therefore, it is necessary to calculate pose variation of each camera coordinate system based on outputs of the rotation axis encoders, which requires knowing positional relationships between each rotation axis and camera coordinate system. For a rigid body, positional relationships between each rotation axis and the camera are kept unchanged. In order to determine positional relationships between each rotation axis and camera coordinate system, a mathematical model is created as shown in FIG. 6. The camera coordinate system (also called the "system C" hereinafter for short) is denoted as $C\{O_c - x_c y_c z_c\}$. The perpendicular line starting from the optical center $O_c$ of the camera coordinate system is drawn and intersects the rotation axis 1 of the roll degree of freedom at point $O_b$. The perpendicular line extends to get a ray $O_b x_b$. The rotation axis coordinate system $B\{O_b - x_b y_b z_b\}$ (also called the "system B" hereinafter for short) is established, with $O_b$ as an origin, the ray $O_b x_b$ as an x axis, the rotation axis as a y axis, and a z axis determined according to the right-hand rule.

If $O_c O_b = d$ (which is a constant value that may be determined by the mechanical machining technique), then coordinate of $O_c$ in the system B can be represented as $t = (-d, 0, 0)^T$. Let $R_{BC}$ be a rotation matrix from the camera coordinate system C to the rotation axis coordinate system B. For any point P in space, its coordinate PC in the system C and coordinate PB in the system B satisfies the transformation equation $P_B = R_{BC} P_C + t$ expressed in homogeneous coordinates as:

$$\begin{bmatrix} x_B \\ y_B \\ z_B \\ 1 \end{bmatrix} = \begin{bmatrix} R_{BC} & t \\ O & 1 \end{bmatrix} \begin{bmatrix} x_C \\ y_C \\ z_C \\ 1 \end{bmatrix}, \quad (1)$$

where $$T_{BC} = \begin{bmatrix} R_{BC} & t \\ O & 1 \end{bmatrix}$$

is the desired calibration result, which is a transformation matrix from the system B to C for any point P in space.

After a rotation about the rotation axis by an angle θ, the rotation axis coordinate system B and the camera coordinate system C become new rotation axis coordinate system B' and new camera coordinate system C'. The rotation about the rotation axis is equivalent to a corresponding rotation of the system B to B' about the $z_b$ axis by the angle θ. For the same point P, its coordinate $P_B$ in the system B and coordinate $P_B'$ in system B' satisfy:

$$P_{B'} = \begin{bmatrix} R_{B'B} & O \\ O & 1 \end{bmatrix} P_B, \quad (2)$$

where $$R_{B'B} = \begin{bmatrix} \cos\theta & 0 & \sin\theta \\ 0 & 1 & 0 \\ -\sin\theta & 0 & \cos\theta \end{bmatrix}$$

(this value depends on the angle of rotation).

Similarly, the camera coordinate system rotates by the angle θ into the new camera coordinate system C'. During calibration, the transformation of the camera coordinate system can be calculated using a fixed checkerboard. Assuming a point P is represented by a coordinate $x_w$ in a world coordinate system of the checkerboard, calculated extrinsic parameters of the checkerboard in the systems C and C' will be $T_{CW}$ and $T_{C'W}$, respectively. Since $P_C = T_{CW} x_w$ and $P_{C'} = T_{C'W} x_w$, the following equation can be get:

$$P_C = T_{C'W} T_{CW}^{-1} P_C = T_{C'C} P_C. \quad (3)$$

Because of the nature of a rigid body, the relative positional relationship $T_{BC}$ between the systems B and C remains unchanged in the rotating process. Thus, the same point in the space still satisfies Eqn. (1) in the new coordinate systems B' and C', and the following equation is get.

$$P_{B'} = \begin{bmatrix} R_{BC} & t \\ O & 1 \end{bmatrix} P_{C'}. \quad (4)$$

From Eqns. (2), (3) and (4), the following equation is get.

$$\begin{bmatrix} R_{BC} & t \\ O & 1 \end{bmatrix}^{-1} \begin{bmatrix} R_{B'B} & O \\ O & 1 \end{bmatrix} \begin{bmatrix} R_{BC} & t \\ O & 1 \end{bmatrix} = \begin{bmatrix} R_{C'C} & t_{C'C} \\ O & 1 \end{bmatrix}, \quad (5)$$

where $$\begin{bmatrix} R_{BC} & t \\ O & 1 \end{bmatrix}$$

is the matrix that needs to be solved in the rotation axis calibration process, $$\begin{bmatrix} R_{B'B} & O \\ O & 1 \end{bmatrix}$$

is a matrix output from position sensors for each rotation, and $$\begin{bmatrix} R_{C'C} & t_{C'C} \\ O & 1 \end{bmatrix}$$

is a matrix $T_{C'C}$ calculated by the camera for each rotation. The $T_{BC}$ calculated for each rotation is used to calibrate relationship between the rotation axis and the camera coordinate system.

For a given set of data $\{R_{Ci}, T_{Ci}, \theta_{1i}, \theta_{2i}, \theta_{3i}\}$ (i=1 ... P), the rotation angles for this set of data relative to the reference position can be calculated as $\{\theta_{1i}-\theta_{f1}, \theta_{2i}-\theta_{f2}, \theta_{3i}-\theta_{f3}\}$ (i=1 ... P), and the rotation matrices can be calculated as:

$$\begin{cases} R_{B'B1i} = \begin{bmatrix} \cos(\theta_{1I}-\theta_{f1}) & -\sin(\theta_{1I}-\theta_{f1}) & 0 \\ -\sin(\theta_{1I}-\theta_{f1}) & \cos(\theta_{1I}-\theta_{f1}) & 0 \\ 0 & 0 & 1 \end{bmatrix} \\ R_{B'B2i} = \begin{bmatrix} 1 & 0 & 0 \\ 0 & \cos(\theta_{2I}-\theta_{f2}) & -\sin(\theta_{2I}-\theta_{f2}) \\ 0 & \sin(\theta_{2I}-\theta_{f2}) & \cos(\theta_{2I}-\theta_{f2}) \end{bmatrix}, i=1...P. \\ R_{B'B3i} = \begin{bmatrix} \cos(\theta_{3I}-\theta_{f3}) & 0 & \sin(\theta_{3I}-\theta_{f3}) \\ 0 & 1 & 0 \\ -\sin(\theta_{3I}-\theta_{f3}) & 0 & \cos(\theta_{3I}-\theta_{f3}) \end{bmatrix} \end{cases} \quad (6)$$

When substituting these into Eqn. (5), the following sets of equations can get:

$$W_{ai} = \begin{bmatrix} R_{BCa} & T_{BCa} \\ O & 1 \end{bmatrix}^{-1} \begin{bmatrix} R_{B'Bai} & 0 \\ O & 1 \end{bmatrix} \begin{bmatrix} R_{BCa} & T_{BCa} \\ O & 1 \end{bmatrix}, \quad (7)$$

$$a = 1...3, i = 1...P$$

$$W_{1i} W_{2i} W_{3i} = \begin{bmatrix} R_{Ci} & T_{Ci} \\ O & 1 \end{bmatrix}, i = 1...P$$

P sets of equations can be obtained when all the data is substituted into Eqn. (7), and optimal solutions $\{R_{BCa}, T_{BCa}\}$ (a=1 ... 3) can be obtained by solving those equations.

This process is repeated for motors Nos. 4-6 for the right "eyeball". As a result, calibration results $\{R_{BCa}, T_{BCa}\}$ (a=1 ... 6) for motion axes of the six motors are obtained.

4. Calculation of Real-Time Calibration Results

The overall calibration results include the reference position information $(\theta_{f1}, \theta_{f2}, \theta_{f3}, \theta_{f4}, \theta_{f5}, \theta_{f6})$, stereo calibration results $\{R_l, T_l\}$ and motion axis calibration results $\{R_{BCa}, T_{BCa}\}$ (a=1 ... 6). When each camera component in the movable binocular vision system has moved, position information $(\theta_{p1}, \theta_{p2}, \theta_{p3}, \theta_{p4}, \theta_{p5}, \theta_{p6})$ in the 6 motional degrees of freedom is obtained. Rotation angles in the six degrees of freedom are obtained from the position information as $(\theta_{p1}-\theta_{f1}, \theta_{p2}-\theta_{f2}, \theta_{p3}-\theta_{f3}, \theta_{p4}-\theta_{f4}, \theta_{p5}-\theta_{f5}, \theta_{p6}-\theta_{f6})$, which are then converted into a rotation matrix $(R_{p1}, R_{p2}, R_{p3}, R_{p4},$ $R_{p5}, R_{p6}$ These are fed into the following equation to obtain post-movement extrinsic parameters (a rotation matrix R' and a translation matrix) of the six-DOF movable binocular vision system, i.e., real-time calibration results:

$$W_a = \begin{bmatrix} R_{BCa} & T_{BCa} \\ O & 1 \end{bmatrix}^{-1} \begin{bmatrix} R_{pa} & 0 \\ O & 1 \end{bmatrix} \begin{bmatrix} R_{BCa} & T_{BCa} \\ O & 1 \end{bmatrix},$$

$$a = 1 \ldots 6$$

$$\begin{bmatrix} R' & T' \\ O & 1 \end{bmatrix} = (W_4 W_5 W_6) \begin{bmatrix} R_I & T_I \\ O & 1 \end{bmatrix} (W_1 W_2 W_3)^{-1},$$

The movable binocular vision system and stereo calibration method mentioned in the present application are not limited to the foregoing embodiments. Although additional steps are added to the embodiments for increased accuracy or reduced computational complexity in practical use, other various variations and modifications can be made without departing from the principles of the present application.

The scope of the present application is not limited to the embodiments disclosed hereinabove. Rather, it embraces any and all changes or advantages that can be devised by those skilled in the art without departing from the spirit and scope of conception of this application. Thus, the actual protection scope of the application is defined by the appended claims.

What is claimed is:

1. A stereo calibration method of a movable multi-ocular vision system, wherein the movable multi-ocular vision system comprises:
   at least two imaging components, each comprising at least one imaging element capable of capturing consecutive images and having an arbitrary number of rotation axes, wherein each rotation axis is provided with a position acquisition device capable of acquiring rotation or translation information;
   at least one calculation component capable of calculating and processing information of images and information of movement in association with each rotation axis;
   at least one control component capable of controlling movement in association with each rotation axis, and
   wherein the stereo calibration method comprises: acquiring a position information for each rotation axis at a corresponding reference position;
   for each imaging element, placing a calibration template in front of the imaging element; rotating an a-th rotation axis for a plurality of times, and for each rotation, capturing an image information and recording a position information of each rotation axis, where a=1 ... N, a represents a serial number of a rotation axis, N represents a number of rotation axes;
   calculating rotation and translation transformation matrices for each captured image with respect to the position of the calibration template by using a calibration algorithm and a sequence of images captured at respective rotations; and
   calculating calibration results for the imaging element and each rotation axis by the calculation component, wherein the calibration results comprise rotation matrix and translation matrix of each rotation axis relative to the imaging element.

2. The stereo calibration method of claim 1, wherein the position acquisition device is provided in respective rotation axis for obtaining information of movement in respective rotation axis.

3. The stereo calibration method of claim 1, wherein at least one of the imaging components has one or more rotation axes.

4. The stereo calibration method of claim 1, wherein the calibration template includes one of a natural static scene and an artificial standard target, wherein the natural static scene when serving as the calibration template provides invariant image features and known information of position relationship between the image features, and wherein the artificial standard target includes at least one of a two-dimensional (2D) planar target and a three-dimensional (3D) stereoscopic target.

5. The stereo calibration method of claim 1, comprising the steps of:
   for each imaging component, recording position information of the imaging component in each rotation axis at a reference position; obtaining precise parameters about relative positions between imaging elements by performing a stereo calibration at the reference position; performing a calibration process for each rotation axis and calculating, by the calculation component, rotation matrix and translation matrix of each rotation axis in the respective rotation axis relative to an imaging element coordinate system.

6. The stereo calibration method of claim 1, wherein the stereo calibration results include reference position information, stereo calibration results of the imaging element at the reference position, and rotation and translation relationships of each rotation axis relative to an imaging element coordinate system, the stereo calibration results of the imaging element at the reference position including rotation and translation relationships between imaging elements.

7. The stereo calibration method of claim 1, further comprising calculating and obtaining rotation and translation matrices indicating relative positional relationships between the imaging elements by feeding the calibration results and position information of each rotation axis into a relationship model between an imaging element coordinate system and a coordinate system of respective rotation axes.

8. The stereo calibration method of claim 7, wherein the relationship model is $$W_a = \begin{bmatrix} R_{BCa} & T_{BCa} \\ O & 1 \end{bmatrix}^{-1} \begin{bmatrix} R_a & 0 \\ O & 1 \end{bmatrix} \begin{bmatrix} R_{BCa} & T_{BCa} \\ O & 1 \end{bmatrix},$$

$$a = \sum_{k=1}^{x-1} N_k + 1 \ldots \sum_{k=1}^{x} N_k, \sum_{k=1}^{y-1} N_k + 1 \ldots \sum_{k=1}^{y} N_k$$

$$\begin{bmatrix} R' & T' \\ O & 1 \end{bmatrix} = \left( \prod_{a=\sum_{k=1}^{y-1} N_k+1}^{\sum_{k=1}^{y} N_k} W_a \right) \begin{bmatrix} R_{I(x,y)} & T_{I(x,y)} \\ O & 1 \end{bmatrix} \left( \prod_{a=\sum_{k=1}^{x-1} N_k+1}^{\sum_{k=1}^{x} N_k} W_a \right)^{-1},$$

where R' and T' are rotation and translation matrices in extrinsic parameter calculation results of two imaging components that constitutes a movable binocular vision sub-system at a current position respectively, the movable binocular vision sub-system made up of any two imaging components in the movable multi-ocular vision system, $R_{BCa}, T_{BCa}$ are rotation and translation matrices of an a-th rotation axis relative to the imaging element coordinate system, respectively, $N_k$ is a total number of rotation axes in a k-th imaging component, x,y represent serial numbers of the two imaging components, which are "left eyes" and "right eyes" in the movable binocular vision sub-system, respectively, $R_a$ is a rotation matrix converted from a rotation angle of the a-th rotation axis relative to the reference position; and $R_{I(x,y)}, T_{I(x,y)}$ are relative rotation and translation matrices between the "left eyes" and "right eyes" at the reference position.

\* \* \* \* \*